(12) United States Patent
Gardiner

(10) Patent No.: US 7,376,234 B1
(45) Date of Patent: May 20, 2008

(54) PORTABLE KEYING DEVICE AND METHOD

(75) Inventor: Robert C. Gardiner, Fayetteville, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 751 days.

(21) Appl. No.: 09/854,756

(22) Filed: May 14, 2001

(51) Int. Cl.
*H04L 9/00* (2006.01)

(52) U.S. Cl. ..................................... 380/259

(58) Field of Classification Search ................ 380/277, 380/44, 279, 259, 282, 270, 283, 278; 340/10, 340/5.2, 10.41; 455/90; 713/171, 191, 172; 726/9, 20
See application file for complete search history.

(56) References Cited

U.S. PATENT DOCUMENTS

| | | |
|---|---|---|
| 4,059,831 A | 11/1977 | Epstein |
| 4,484,160 A | 11/1984 | Riha |
| 4,527,204 A | 7/1985 | Kozakai et al. |
| 4,604,623 A | 8/1986 | Skeie |
| 4,605,929 A | 8/1986 | Skeie |
| 4,620,191 A | 10/1986 | Skeie |
| 4,623,890 A | 11/1986 | Nysen |
| 4,625,207 A | 11/1986 | Skeie |
| 4,625,208 A | 11/1986 | Skeie et al. |
| 4,703,327 A | 10/1987 | Rossetti et al. |
| 4,724,443 A | 2/1988 | Nysen |
| 4,725,841 A | 2/1988 | Nysen et al. |
| 4,734,698 A | 3/1988 | Nysen et al. |
| 4,737,789 A | 4/1988 | Nysen |
| 4,737,790 A | 4/1988 | Skeie et al. |
| 4,951,057 A | 8/1990 | Nagel |
| 5,095,240 A | 3/1992 | Nysen et al. |
| 5,113,438 A | 5/1992 | Blokker, Jr. et al. |
| 5,182,570 A | 1/1993 | Nysen et al. |
| 5,351,969 A | 10/1994 | Smith, III et al. |
| 5,378,880 A | 1/1995 | Eberhardt |
| 5,457,448 A | 10/1995 | Totsuka et al. |
| 5,521,369 A | 5/1996 | Kumar |
| 5,621,199 A | 4/1997 | Calari et al. |
| 5,703,347 A | 12/1997 | Reddersen et al. |
| 5,774,172 A | 6/1998 | Kapell et al. |
| 5,887,063 A * | 3/1999 | Varadharajan et al. ...... 713/172 |
| 5,902,991 A | 5/1999 | Kumar |
| 5,926,168 A | 7/1999 | Fan |
| 5,963,132 A | 10/1999 | Yoakum |
| 5,986,562 A | 11/1999 | Nikolich |
| 6,078,791 A * | 6/2000 | Tuttle et al. ................ 455/90.1 |
| 6,094,239 A | 7/2000 | Weber |
| 6,097,301 A | 8/2000 | Tuttle |
| 6,185,307 B1 * | 2/2001 | Johnson, Jr. ................ 380/270 |
| 6,212,280 B1 * | 4/2001 | Howard et al. ............. 380/279 |
| 6,226,749 B1 * | 5/2001 | Carloganu et al. ............. 726/2 |
| 6,232,870 B1 | 5/2001 | Garber et al. |

(Continued)

*Primary Examiner*—Ellen Tran
(74) *Attorney, Agent, or Firm*—Marjama Muldoon Blasiak & Sullivan LLP

(57) ABSTRACT

A portable encryption key installation system is disclosed that includes a portable keying device for installing a data communications encryption in an electronic terminal. The portable keying device securely reprograms the encryption key in the electronic terminal without having to remove the terminal from its shipping container or ship the electronic terminal off-site. Furthermore, the portable keying device securely reprograms the encryption key in the electronic terminal without having to dismantle the terminal, deactivate any anti-tampering features, or re-bond the terminal.

41 Claims, 8 Drawing Sheets

U.S. PATENT DOCUMENTS

| | | |
|---|---|---|
| 6,264,106 B1 | 7/2001 | Bridgelall |
| 6,293,467 B1 | 9/2001 | Reddersen et al. |
| 6,307,517 B1 | 10/2001 | Lee |
| 6,318,636 B1 | 11/2001 | Reynolds et al. |
| 6,329,920 B1 | 12/2001 | Morrison et al. |
| 6,433,671 B1 * | 8/2002 | Nysen .................... 340/10.41 |
| 6,553,348 B1 * | 4/2003 | Hashimoto .................. 705/16 |
| 6,611,194 B1 * | 8/2003 | Vieweg et al. ............... 340/5.2 |
| 6,684,334 B1 * | 1/2004 | Abraham .................... 713/194 |
| 6,711,263 B1 * | 3/2004 | Nordenstam et al. ....... 380/282 |
| 6,859,537 B1 * | 2/2005 | Houlberg et al. ........... 380/277 |
| 2001/0008390 A1 | 7/2001 | Berquist et al. |
| 2001/0042786 A1 | 11/2001 | Reynolds et al. |
| 2001/0045460 A1 | 11/2001 | Reynolds et al. |

\* cited by examiner

PORTABLE KEYING DEVICE AND METHOD

BACKGROUND OF THE INVENTION

1. Field of the Invention

The present invention relates generally to transaction terminals, and particularly to the installation of security keys in transaction terminals.

2. Technical Background

Electronic terminal such as point-of-sale (POS) terminals are becoming ubiquitous in our society. These terminals include credit, debit, and check authorization capabilities. Some of these devices are used as stand-alone devices and some are networked using LAN technology. Because of the sensitive financial information being transmitted and received by these electronic terminals, security is a critical issue. In order to provided security, electronic terminals employ data encryption. Encryption devices scramble readable data to produce cipher text. Most of the terminals use an encryption key as part of the encryption process. An encryption key is a block of data that is combined with the readable input data to produce the cipher text. For example, the encryption key and the input data can be combined using an exclusive-OR function. On the other hand, the Data Encryption Standard (DES) algorithm is often used to combine an encryption key with input data to produce the cipher text. The DES algorithm employs a 56-bit encryption key to produce the cipher text. The use of an encryption key is considered to be more secure than scrambling the input data.

Another security issue relates to tamper protection. Typically, all secure information such as encryption keys are stored in SRAM or PROM. In one approach, if the processor detects a downloading operation that may result in security information being compromised, the processor deletes the security information.

In another approach, tamper detection switches are employed to prevent physical tampering of the terminal. If the top enclosure of the terminal is separated from the main printed circuit board, or if the "trap door" is opened in the bottom of the enclosure, the detection switches are thrown. The operating system of the terminal is programmed to erase the security information in response to the signals received from the switches. In another approach, ultrasonic bonding is often used to provide evidence that someone attempted to open the terminal device.

While the above described methods are effective in terms of preventing or monitoring tampering, there are problems associated with these methods. Under certain circumstances the security information loaded into the electronic terminal must be changed or updated. Oftentimes it is desirable to change the security information loaded into the electronic terminal at the factory before the first use. At this point, the terminal must be shipped to the factory or to a servicing organization to be reprogrammed. Subsequently, the terminal is unboxed, the anti-tampering features are de-activated, the security information is reloaded, the terminal re-bonded and the terminal is repackaged. These steps are inefficient, time consuming and costly.

What is needed is a method of securely reprogramming the security information in an electronic terminal without having to remove the terminal from its shipping container, dismantle the terminal, de-activate the anti-tampering features, reload the security information, and re-bond the terminal. Further, what is needed is a method of securely reprogramming the security information in an electronic terminal without having to ship the terminal off-site.

SUMMARY OF THE INVENTION

The present invention addresses the needs discussed above. The present invention provides a system and method for securely reprogramming the security information in an electronic terminal without having to ship the terminal off-site. The present invention provides a system and method for securely reprogramming the security information in an electronic terminal without having to remove the terminal from its shipping container, dismantle the terminal, de-activate the anti-tampering features, reload the security information, and re-bond the terminal.

One aspect of the present invention is a portable keying device for installing a data communications encryption key in at least one electronic terminal. The electronic terminal includes a secure encryption key memory location for storing at least one data communications encryption key. The device includes a memory device for storing the at least one data communications encryption key. A communications unit is coupled to the memory device, the communications unit being operative to transmit the at least one data communications encryption key in a predetermined format to the electronic terminal.

In another aspect, the present invention includes a method for installing a data communications encryption key in an electronic terminal. The electronic terminal including a secure encryption key memory location for storing the at least one data communications encryption key. The method includes: providing a portable keying device, whereby the portable keying device is physically separated from the electronic terminal; performing a handshaking routine, whereby the keying device and the electronic terminal exchange handshaking messages; transmitting an encryption key from the portable keying device to the electronic terminal; and storing the encryption key transmitted from the portable keying device to the electronic terminal in the secure key memory location.

In yet another aspect, the present invention includes a portable key installation system for installing a data communications encryption key. The system includes at least one electronic terminal having a secure encryption key memory adapted to store the at least one data communications encryption key, and a terminal communications unit coupled to the secure encryption key memory. A portable keying device includes a memory adapted to store the at least one data communications encryption key, and a device communications unit coupled to the memory device, the device communications unit being adapted to bi-directionally communicate the at least one data communications encryption key in a predetermined format to the terminal communications unit.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understating the nature and character of the invention as it is claimed. The accompanying drawings are included to provide a further understanding to the invention, and are incorporated in and constitute a part of this specification. The drawings illustrate various embodi-

DETAILED DESCRIPTION

Figure 1:
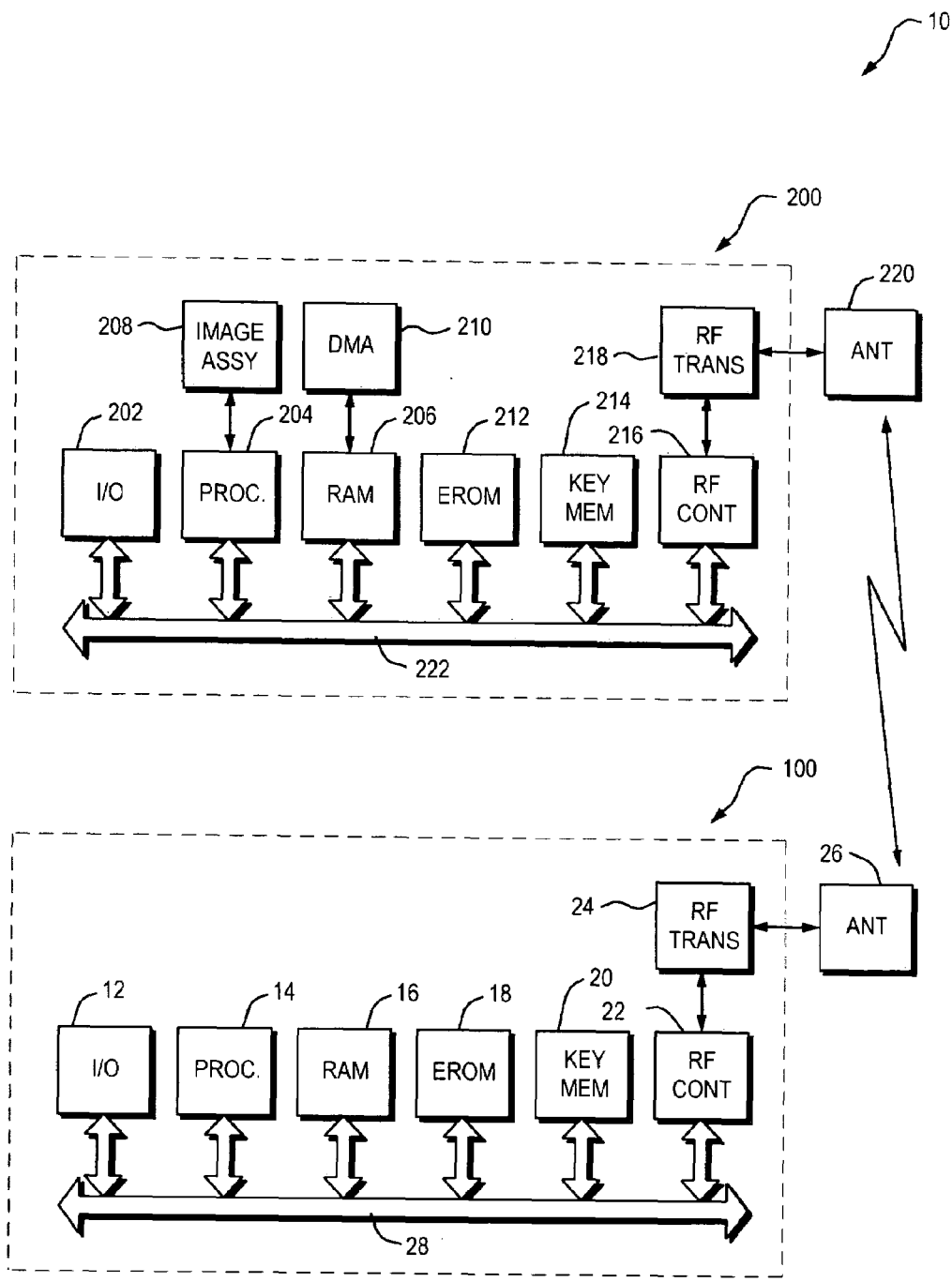
FIG. 1 is a diagrammatic depiction of a portable key installation system in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the portable key installation system of the present invention is shown in FIG. 1, and is designated generally throughout by reference numeral 10.

In accordance with the invention, the present invention for a portable key installation system includes a portable keying device for installing a data communications encryption key in an electronic terminal. The electronic terminal including a secure encryption key memory location for storing the at least one data communications encryption key. The portable keying device includes a memory for storing the at least one data communications encryption key. A processor that is operative to generate a secure installation message, the secure installation message including the at least one data communications encryption key. A communications unit is coupled to the processor. The communications unit is operative to transmit the installation message in a predetermined format to the electronic terminal.

Thus, the present invention provides s system and method for securely reprogramming the security information in an electronic terminal without having to ship the electronic terminal off-site. The present invention provides a system and method for securely reprogramming the security information in an electronic terminal without having to remove the electronic terminal from its shipping container, dismantle the terminal, de-activate the anti-tampering features, reload the security information, and re-bond the terminal.

As embodied herein, and depicted in FIG. 1 a diagrammatic depiction of a portable key installation system in accordance with one embodiment of the present invention is disclosed. System 10 includes portable keying device 100 and electronic terminal 200.

Portable keying device 100 includes I/O circuit 12, processor 14, RAM 16, EROM 18, key memory 20 and RF controller 22 coupled by way of system bus 28. RF controller 22 is connected to RF transceiver 24. RF transceiver 24 is connected to antenna 26. In one embodiment, I/O circuit 12 is coupled to a keypad which is used to input the encryption key. In yet another embodiment, an initial key download is performed via the keypad or the external device. Subsequently, processor 14 uses the initial key to generate encryption keys for a plurality of devices by running a secure key generation algorithm.

It will be apparent to those of ordinary skill in the pertinent are that modifications and variations can be made to processor 14 of the present invention depending on cost and programming considerations. For example, in one embodiment processor 14 is implemented using an 8-bit "programmable system-on-a-chp" device, of the type manufactured by Cypress Semiconductor. One of ordinary skill in the art will recognize that 16-bit and 32-bit devices can also be used, in addition to other 8-bit devices.

It will be apparent to those of ordinary skill in the pertinent art that modifications and variations can be made to EROM 18 and key memory 20 of the present invention depending on cost, security, and re-programmability considerations. In one embodiment key memory 20 is actually a memory location within EROM 18. For example, in the 8-bit micro-controller embodiment, EROM 18 and key memory 20 are implemented using 32 kbytes of embedded ROM. Ram 16 is implemented using 1 kbyte of embedded RAM. In another embodiment, key memory 20 is implemented using a separate memory device. In general key memory 20 is implemented using non-volatile memory such as $E^2PROM$, Flash EPROM, battery-backed RAM, or Ferro RAM (FRAM). Re-programmability is an issue in the keying device because the device is re-usable to reprogram any number of terminals 200.

Figure 2:
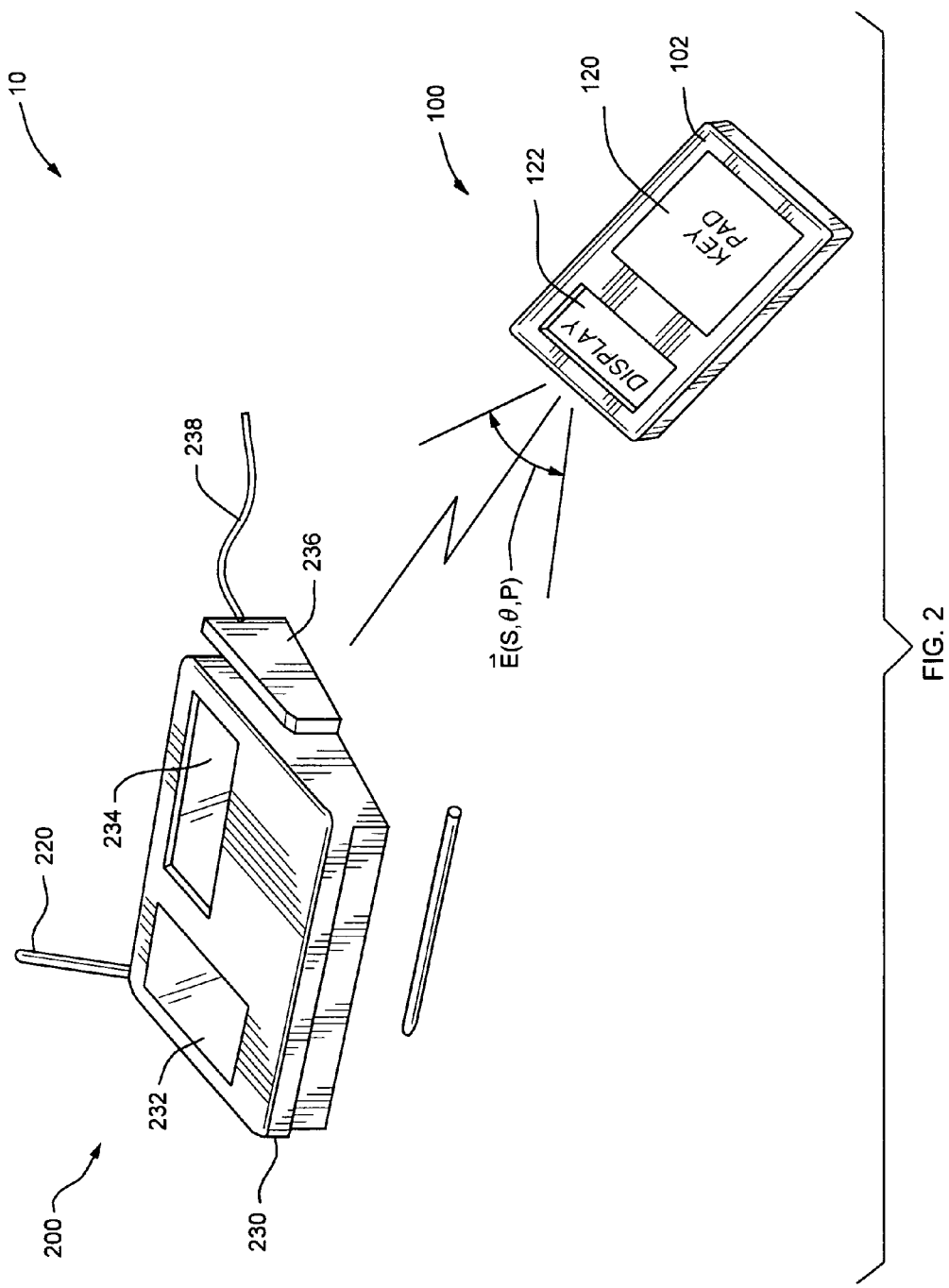
FIG. 2 is a perspective view of a portable key installation system depicted in FIG. 1.

It will be apparent to those of ordinary skill in the pertinent are that modifications and variations can be made to RF controller 216, RF transceiver 218, and antenna 200 of the present invention depending on cost and implementation considerations. For example, in FIG. 1 and FIG. 2, a low power/close proximity RF system is depicted. In this embodiment, transceiver 24 outputs approximately 1 multi-Watt and has an effective range of about 1 meter of less. In another embodiment, the RF components are replaced altogether by an infrared optical communications system. In yet another embodiment, the RF components are replace by an audio communications system that employs DTMF technology.

Referring back to FIG. 1, any type of electronic terminal 200 can be employed in system 10 of the present invention. In one embodiment, electronic terminal 200 is a simple hand-wired terminal. In other embodiments, terminal 200 is a keypad, signature pad, card reader, bar code reader, or a POS retail transaction terminal. In yet another embodiment, electronic terminal 200 is a stand alone unit. In an alternate embodiment, electronic terminal 200 is networked to a LN. In the example depicted in FIG. 1, electronic terminal 200 includes I/O circuit 202, processor 204, RAM 206, EROM 208, key memory 214 and RF controller 216 coupled by way of system bus 222. In this example, terminal 200 includes imaging assemlby 208 for image scanning purposes. Image assembly 208 is controlled by processor 204. Imaging data generated by image assembly 208 is written into RAM 206 by way of DMA channel 210. RF controller 216 is connected to RF transceiver 218. RF transceiver 218 is connected to antenna 220.

In another embodiment, processor 204 includes a general purpose processor and an additional processor to handle secure information including the encryption key. In this embodiment, the additional processor is programmed to handle I/O functions involving a keypad and display. Key memory 214 is embedded in the security processor.

It will be apparent to those of ordinary skill in the pertinent art that modifications and variations can be made to key memory 214 of the present invention depending on cost, security, and re-programmability considerations. In one device 100 transmits an authorization code to electronic terminal 200. The transmitted authorization code must match the authorization code stored in EROM 212 of terminal 200. If the authorization codes match, portable device 100 transmits an installation message in step S304. The installation massage includes the encryption key to be installed. In step S306, terminal 200 retransmits the encryption key to portable device 100. Portable device 100 validates the key by comparing the key that is received from terminal 200 in step S306 with the key it sent to terminal 200 in step S304. If the two keys do not match, portable device 100 performs step S304 over again. As shown in steps S308-S314, device 100 displays an error message to the user after several unsuccessful attempts, indicating that a successful transfer of the key could not be performed. If the key is validated in step S306, processor 204 writes the encryption key into secure key memory 214 in step S316.

In an alternate embodiment, step S306 includes additional steps. Portable device 100 transmits a test encryption key that it believes is currently being stored in key memory 214. If the test encryption key matches the current encryption key, terminal 200 transmits an acknowledgment signal. If the keys do not match, the installation procedure is aborted. Upon receiving the acknowledgment signal, portable device 100 transmits the new encryption key to terminal 200. If the new key is validated in step S306, processor 204 writes the encryption key into secure key memory 214, and the procedure is complete.

Figure 3:
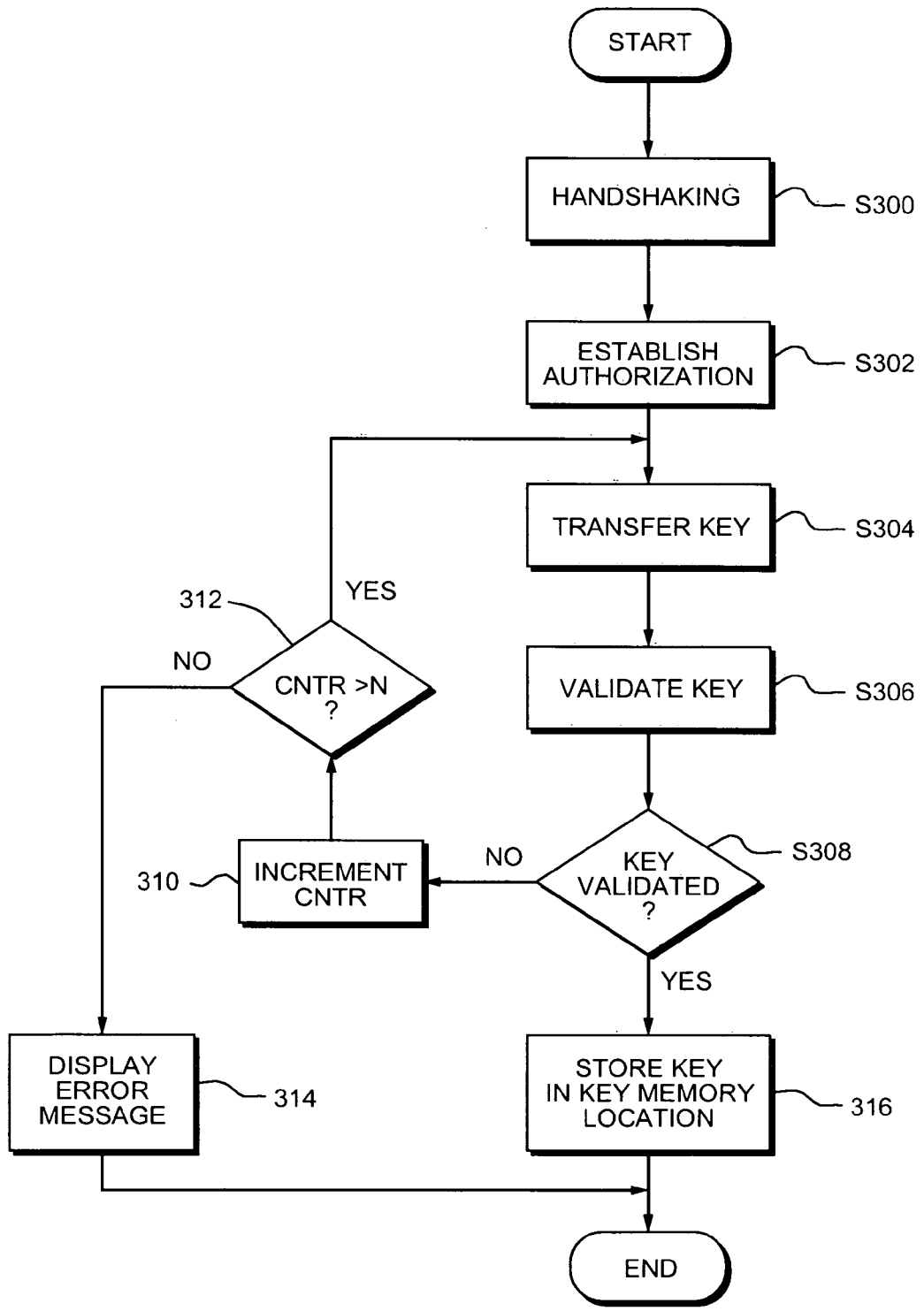
FIG. 3 is a chart showing a method for installing a secure key in an electronic terminal using a portable device.
Figure 4:
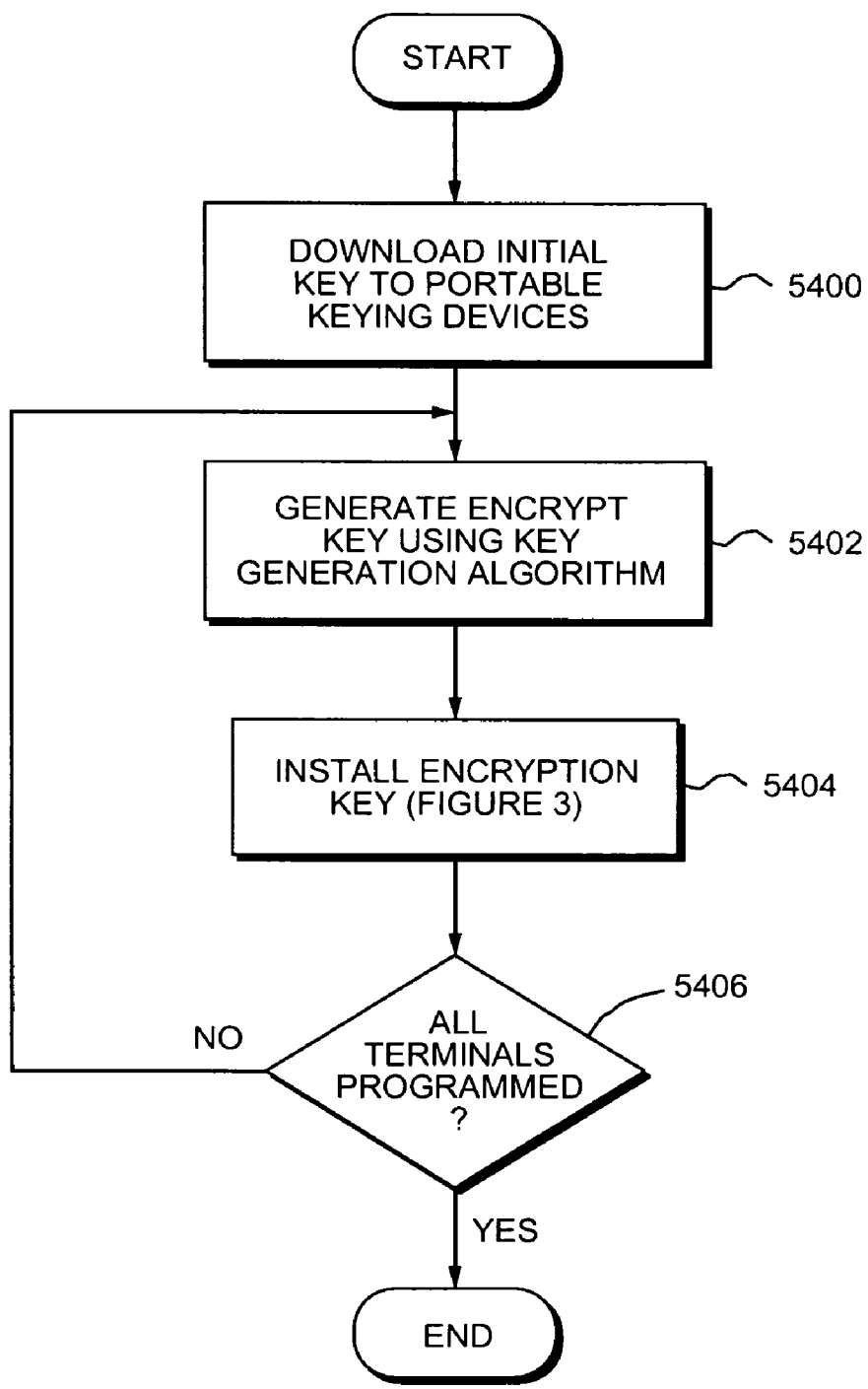
FIG. 4 is a chart showing a method for installing security keys in a plurality of electronic terminals using the portable device.

As embodied herein and depicted in FIG. 4, a chart showing a method for installing security keys in a plurality of electronic terminals is disclosed. As shown in step S400, an initial key is downloaded into memory 16 of portable keying device 100. This step can be performed using keypad 120, or performed electronically using an external computer, or some other such device. Processor 14 uses the initial key to generate encryption keys for a plurality of devices by running a secure key generation algorithm. In step S402, the algorithm is used to generate one encryption key. In step S404, the method depicted in FIG. 3 is employed to install the encryption key in the first terminal. If there are additional terminals to be programmed, steps S402-S406 are repeated until encryption keys are installed in all of the terminals 200.

Figure 5A:
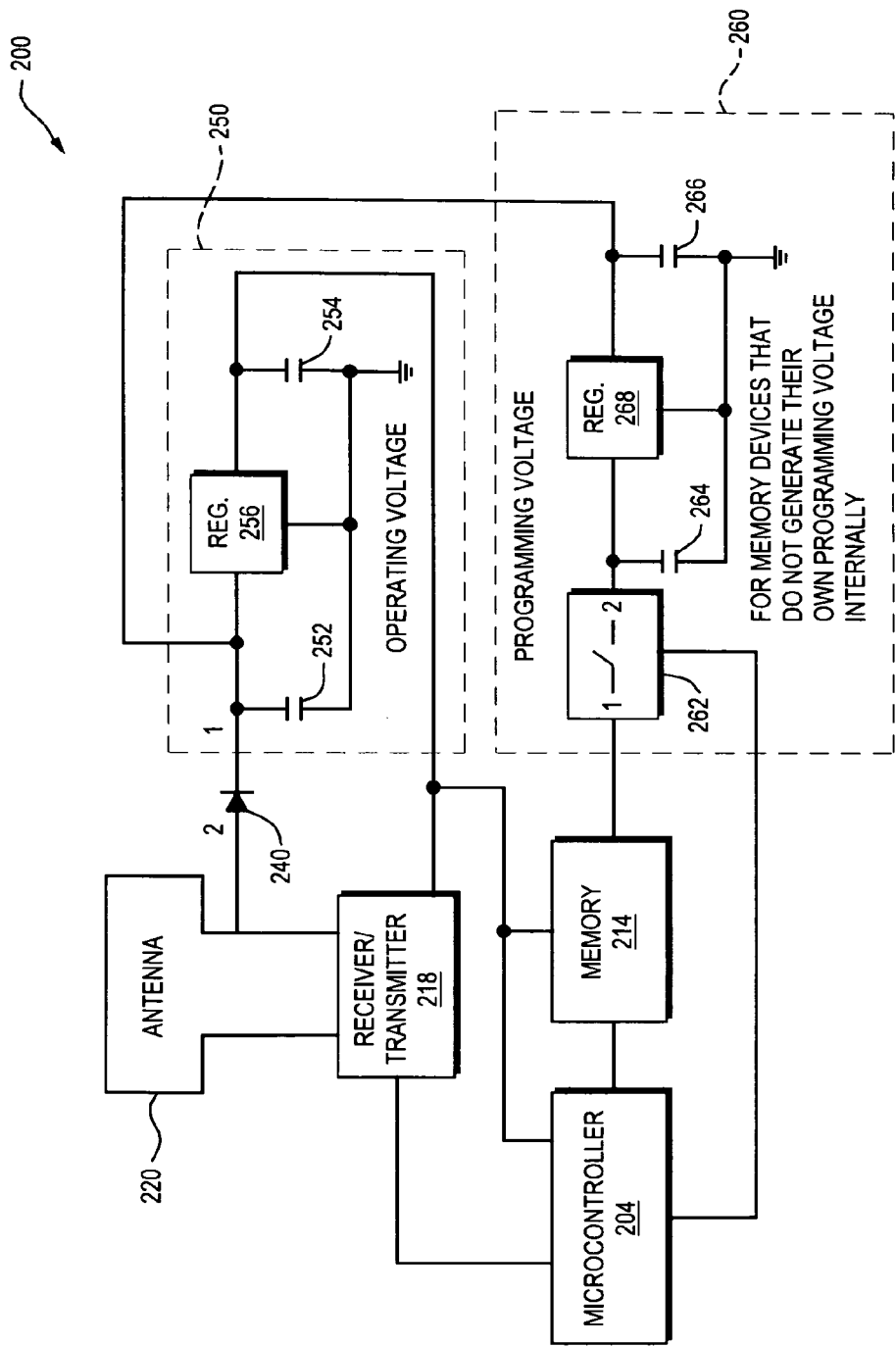
FIGS. 5A and 5B are a diagrammatic depictions of an electronic terminal in accordance with a second embodiment of the present invention.
Figure 5B:
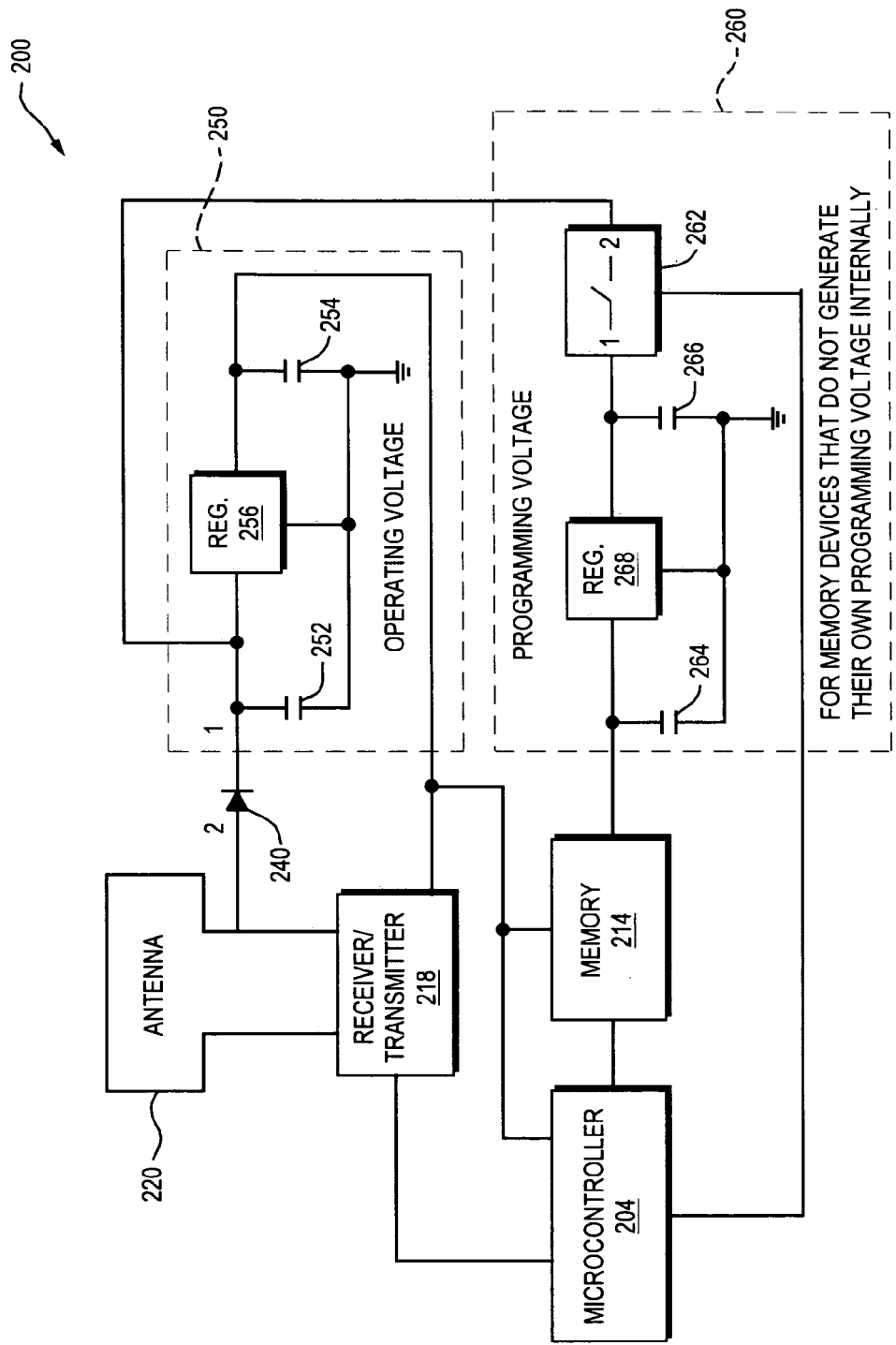

As embodied herein, and depicted in FIG. 5A, a diagrammatic depiction of electronic terminal 200 in accordance with a second embodiment of the present invention is disclosed. In this embodiment, key memory 214 requires an external programming voltage. As described above, terminal 200 includes processor 204, key memory 214, transceiver 218 and antenna 220. In this example it is assumed that terminal 200 is boxed in a shipping container of some sort. Thus, terminal 200 is not connected to any external power supply. However, terminal 200 includes diode 240, normal operating voltage supply 250 and programing voltage supply 260. Normal operating voltage supply 250 includes capacitor 252, capacitor 254, and voltage regulator 256. Programming operating voltage supply 260 includes capacitor 262, capacitor 264, and voltage regulator 266. When portable device 100 transmits an RF signal to terminal 200, diode 240 rectifies the AC-RF signal and prevent any return signal from damaging the RF components. The resultant DC signal is used to charge up capacitors 252, 254, 262 and 264. Voltage regulator 256 ensures that the power supplied to terminal 200 is within system operating parameters. Voltage regulator 266 ensures that memory 214 receives an acceptable programming voltage. In response to the normal operating voltage supplied by supply 250, terminal 200 is energized and ready for key installation. At the proper time, e.g. during step S308 (See FIG. 3), processor 204 activates switch 262 and supply 260 provides memory 214 with the programming voltage required to store the new encryption key therein. FIG. 5B is an alternative embodiment of FIG. 5A. In the alternative embodiment, switch 262 is connected to the output of normal operating voltage supply 250 instead of being connected to the input of key memory 214 as in FIG. 5A. Functionally, there is very little difference between the two alternative embodiments.

Figure 6:
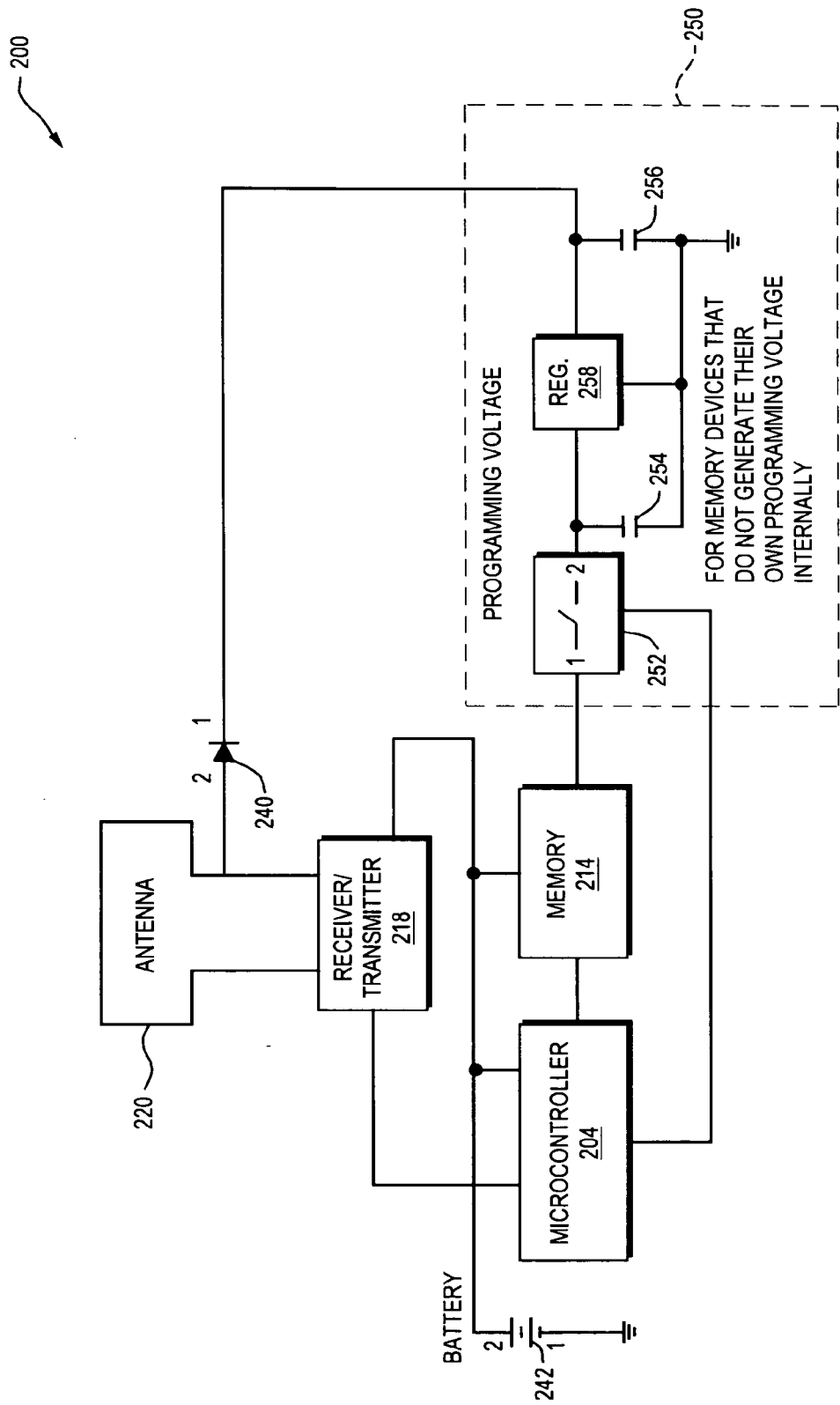
FIG. 6 is a diagrammatic depiction of an electronic terminal in accordance with a third embodiment of the present invention.

As embodied herein, and depicted in FIG. 6, a diagrammatic depiction of an electronic terminal in accordance with a third embodiment of the present invention is disclosed. In this embodiment, battery 242 is included within terminal 200 to provide a normal operating voltage. Diode 240 is included to rectify the RF signal and prevent any return signals from damaging the RF components. Programming operating voltage supply 250 is included to provide programing voltage to key memory 214. Programming operating voltage supply 250 includes capacitor 254, capacitor 255, and voltage regulator 258. When portable device 100 transmits an RF signal to terminal 200, diode 240 rectifies the AC-RF signal. The resultant DC signal is used to charge up capacitors 254 and 256. Again, at the proper time, e.g. during step S308 (See FIG. 3), processor 204 activates switch 252 and supply 250 provides memory 214 with the programing voltage required to store the new encryption key therein.

Figure 7:
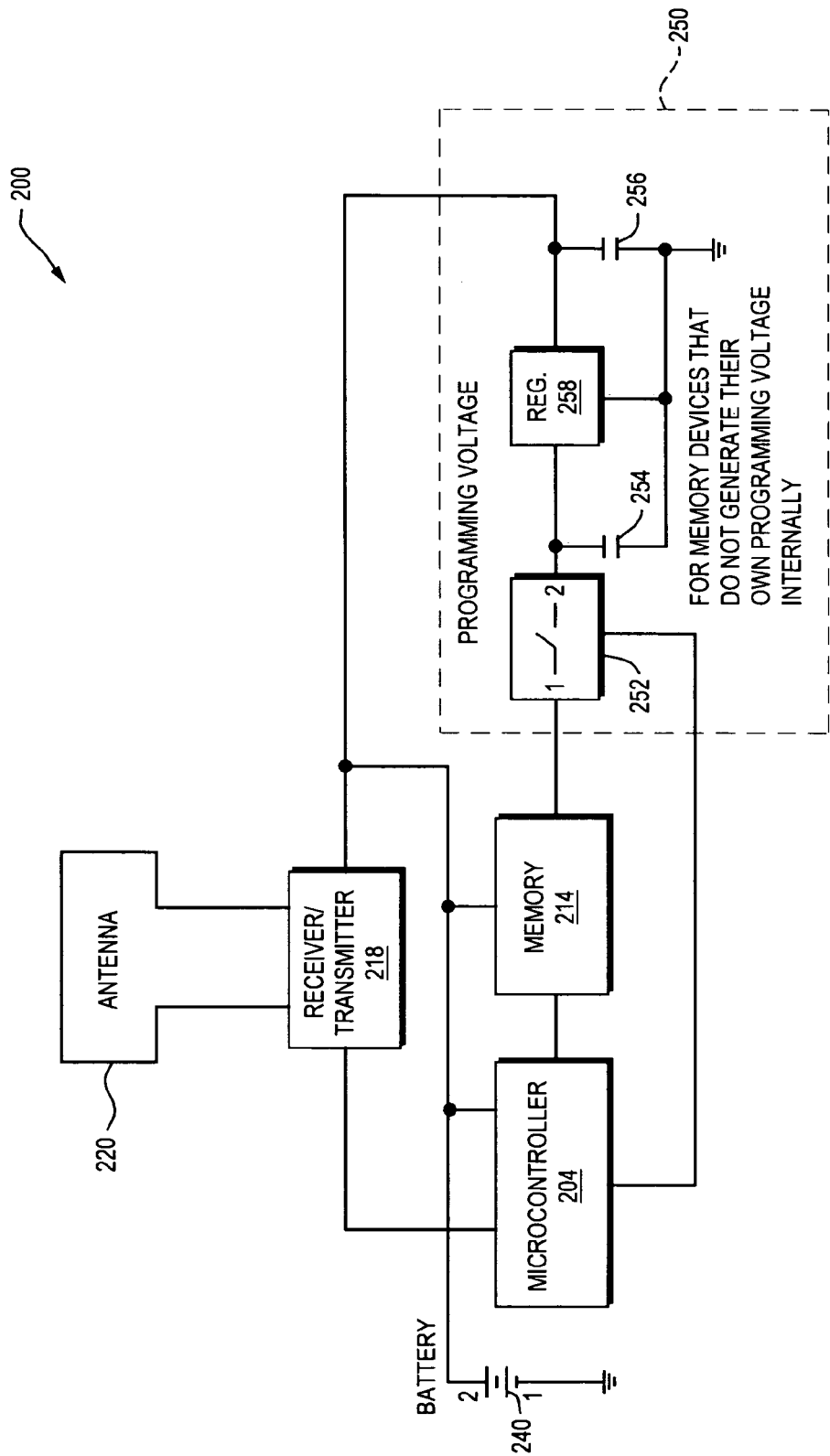
FIG. 7 is a diagrammatic depiction of an electronic terminal in accordance with a fourth embodiment of the present invention.

As embodied herein, and depicted in FIG. 7, a diagrammatic depiction of an electronic terminal in accordance with a fourth embodiment of the present invention is disclosed. In this embodiment, the required programming voltage is supplied internally. Battery 240 is included within terminal 200 to provide both the normal operating voltage and the programming voltage. In this embodiment battery 240 is coupled to programming voltage supply 250. Programming voltage supply 250 is identical to those depicted in FIG. 5A, FIG. 5B and FIG. 6. Since battery 240 supplies DC voltage to capacitors 254 and 256, no rectifying diode is needed. Yet again, at the proper time, e.g. during step S308 (See FIG. 3), processor 204 activates switch 252 and programming supply 250 provides memory 214 with the programming voltage required to store the new encryption key therein.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A portable keying device for installing an encryption key into at least one electronic terminal, the portable keying device comprising:

a memory device for storing the at least one encryption key; and a communications unit coupled to said memory device, the communications unit being operative to transmit said at least one encryption key to an electronic terminal according to a pre-determined format, said electronic terminal including a secure memory location for storing said encryption key, said pre-determined format including transmission of an RF signal at a predetermined power level of less than or equal to 1 mW, and transmission of said RF signal in a direction that resides within an angular range of plus or minus 15 degrees or less of a certain direction, and the transmission of said RF signal having a predetermined polarity.

2. A portable keying device that is configured for installing at least one encryption key into at least one electronic terminal, said portable keying device comprising:
   a memory device for storing at least one encryption key; and
   a communications unit coupled to said memory device, said communications unit being operative to transmit said at least one encryption key in a predetermined format to at least one electronic terminal, said predetermined format including transmission of an RF signal at a predetermined power level, said predetermined format further including a signal being transmitted from said portable keying device in a predetermined direction;
   said at least one electronic terminal includes a secure memory location for storing at least one data communications encryption key and is configured to employ said encryption key for the purpose of encrypting input data.

3. The device of claim 2, wherein the communications unit includes low power close proximity RF transceiver.

4. The device of claim 2, wherein the predetermined power level is less than or equal to 1 mW.

5. The device of claim 2, wherein the RF signal has an effective range of less than or equal to a meter.

6. The device of claim 3, wherein the predetermined direction is a direction residing within a plus or minus fifteen degree angular range of a certain direction.

7. The device of claim 3, wherein the predetermined format includes transmitting an RF signal having a predetermined polarity.

8. The device of claim 2, wherein the predetermined direction is a direction residing within a plus or minus fifteen degree angular range of a certain direction.

9. The device of claim 2, wherein the predetermined direction is a direction residing within a plus or minus fifteen degree angular range of a central emission vector.

10. The device of claim 2, wherein the at least one encryption key is installed in the electronic terminal in accordance with a predetermined protocol.

11. The device of claim 10, wherein the predetermined protocol includes:
   performing a handshaking routine, whereby the keying device and the electronic terminal exchange handshaking messages;
   transmitting the at least one encryption key from the keying device to the electronic terminal in response to a successful handshaking routine;
   validating the step of transmitting by re-transmitting the at least one encryption key from the electronic terminal to the keying device, whereby the keying device compares the transmitted encryption key to the re-transmitted encryption key; and
   storing the at least one encryption key in the secure encryption key memory location in response to a successful step of validating.

12. The device of claim 10, wherein the step of validating includes transmitting a test encryption key from the keying device to the electronic terminal.

13. The device of claim 12, wherein the electronic terminal compares the test encryption key with a currently in-use encryption key stored in the secure encryption key memory location.

14. The device of claim 11, wherein the secure encryption key memory location is a memory location in non-volatile memory.

15. The device of claim 14, wherein the non-volatile memory includes $E^2PROM$.

16. The device of claim 14, wherein the non-volatile memory includes EPROM.

17. The device of claim 14, wherein the non-volatile memory includes Flash memory.

18. The device of claim 14, wherein the non-volatile memory includes battery-backed RAM.

19. A method for installing an encryption key in an electronic terminal, the electronic terminal including a secure encryption key memory location for storing the at least one encryption key, the method comprising:
   providing a portable keying device, whereby the portable keying device is physically separated from the electronic terminal, said portable keying device being configured to transmit said at least one encryption key in a predetermined format to the electronic terminal, said predetermined format including a signal having an effective transmitting range of less than or equal to one meter, said predetermined format further including a signal being transmitted in a predetermined direction from said portable keying device;
   pointing said portable keying device toward said electronic terminal;
   performing a handshaking routine, whereby the keying device and the electronic terminal exchange handshaking messages;
   transmitting an encryption key from the portable keying device to the electronic terminal; and
   storing the encryption key transmitted from the portable keying device to the electronic terminal in the secure key memory location.

20. The method of claim 19, wherein the step of performing a handshaking routine includes transmitting an authorization signal from the portable keying device to the electronic terminal.

21. The method of claim 20, wherein the portable keying device provides the electronic terminal with a predetermined authorization code during the step of transmitting an authorization signal.

22. The method of claim 19, wherein the step of performing a handshaking routine includes transmitting RF signals having at least one predetermined transmission characteristic.

23. The method of claim 22, wherein the at least one predetermined transmission characteristic includes transmitting an RF signal having a predetermined range.

24. The method of claim 22, wherein said predetermined direction is a direction that resides within a plus or minus fifteen degree angular range of a certain direction.

25. The method of claim 19, wherein said predetermined direction is a direction that resides within a plus or minus fifteen degree angular range of a certain direction.

26. The method of claim 19, wherein said predetermined direction is a direction that resides within a plus or minus fifteen degree angular range of a central emission vector.

27. The method of claim 22, wherein the at least one predetermined transmission characteristic includes transmitting an RF signal having a predetermined polarity.

28. The method of claim 22, wherein the at least one predetermined transmission characteristic includes transmitting an RF signal having a predetermined modulation format that is characterized by a predetermined programming voltage.

29. The method of claim 20, wherein the step of transmitting an encryption key further comprises:
   transmitting the at least one encryption key from the keying device to the electronic terminal in response to a successful handshaking routine;
   validating the step of transmitting by re-transmitting the at least one encryption key from the electronic terminal to the keying device, whereby the keying device compares the transmitted encryption key to the re-transmitted encryption key; and
   storing the at least one encryption key in the secure encryption key memory location in response to a successful step of validating.

30. The method of claim 29, wherein the step of validating includes transmitting a test encryption key from the keying device to the electronic terminal before transmitting the at least one encryption key.

31. The method of claim 30, wherein the step of validating includes the electronic terminal comparing the test encryption key with a currently in-use encryption key stored in the secure encryption key memory location.

32. A portable key installation system for installing an encryption key, the system comprising:
   at least one electronic terminal having a secure encryption key memory adapted to store the at least one encryption key, and a terminal communications unit coupled to the secure encryption key memory; and
   a portable keying device including a memory adapted to store the at least one encryption key, and a device communications unit coupled to the memory device, the device communications unit being adapted to bi-directionally communicate the at least one encryption key in a predetermined format to the terminal communications unit, said predetermined format including transmission of an RF signal at a predetermined power level, said predetermined format further including a signal being transmitted in a predetermined direction from said portable keying device.

33. The device of claim 32, wherein the terminal communications unit and the device communications unit include low power close proximity RF transceivers.

34. The portable key installation system of claim 32, wherein said portable keying device includes a display and a keypad, said display being disposed in a first direction relative to said keypad, and wherein said predetermined direction at which said signal is transmitted from said portable keying device is substantially the same direction as said first direction.

35. The portable key installation system of claim 32, wherein said portable keying device includes a display, and wherein said portable keying device is configured to display an error message on said display if a key transmission from said portable keying device to said at least one electronic terminal is not successful.

36. The device of claim 32, wherein the predetermined power level is less than or equal to 1 mW.

37. The device of claim 32, wherein the RF signal has an effective range of less than or equal to a meter.

38. The device of claim 32, wherein the predetermined direction is a direction that resides within a plus or minus fifteen degree angular range of a certain direction.

39. The device of claim 32, wherein the predetermined direction is a direction that resides within a plus or minus fifteen degree angular range of a central emission vector.

40. The device of claim 32, wherein the predetermined direction is a direction that resides within a plus or minus fifteen degree angular range of a central emission vector.

41. The device of claim 32, wherein the predetermined format includes transmitting an RF signal having a predetermined polarity.

* * * * *